Dec. 18, 1923.
W. AAB
1,477,622
WRIST PIN
Filed March 27, 1922
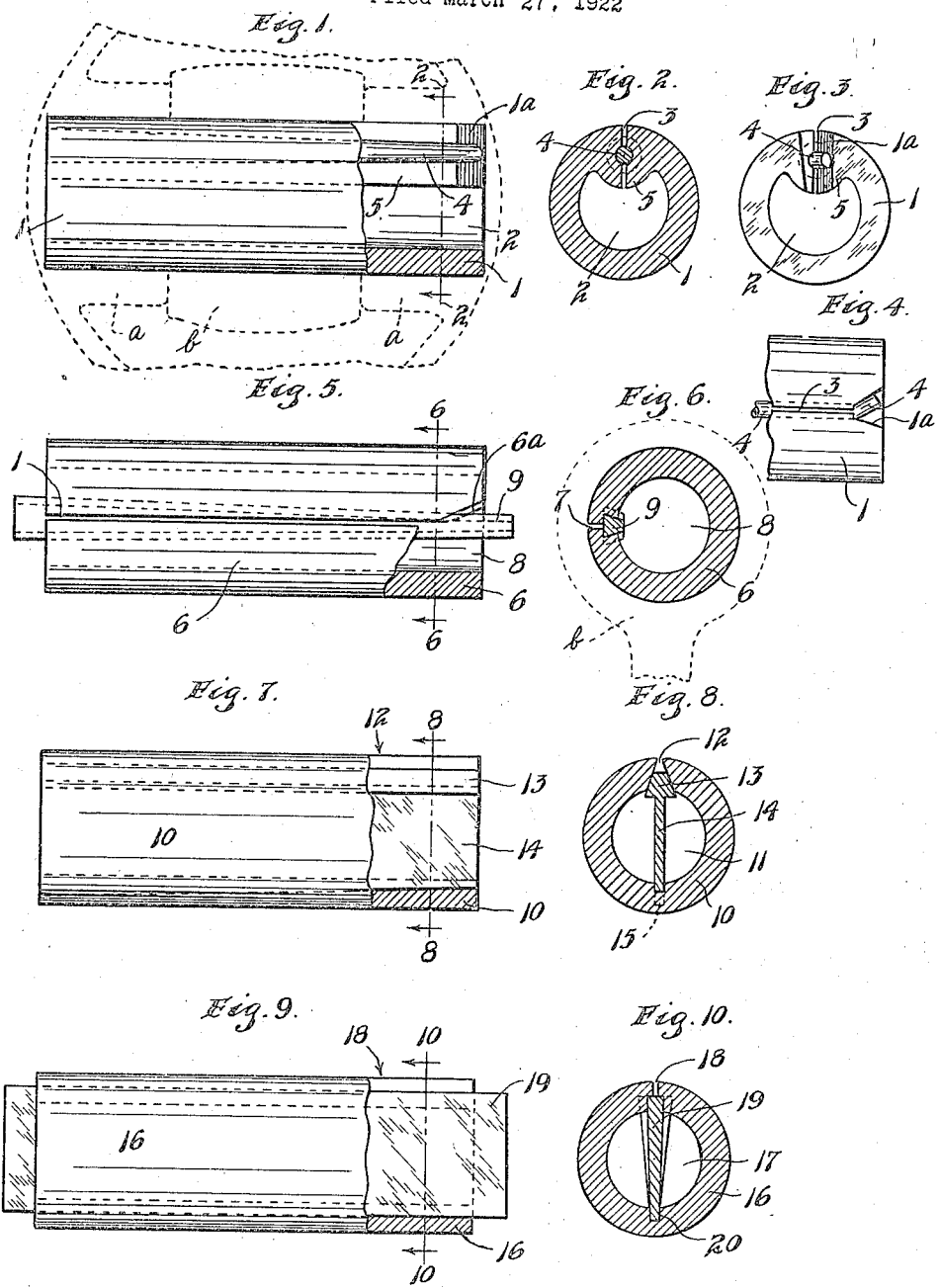
INVENTOR.
WILLIAM AAB.
BY HIS ATTORNEY.
James F. Williamson Patented Dec. 18, 1923.

1,477,622

UNITED STATES PATENT OFFICE.

WILLIAM AAB, OF NEW ULM, MINNESOTA.

WRIST PIN.

Application filed March 27, 1922. Serial No. 547,014.

*To all whom it may concern:*

Be it known that I, WILLIAM AAB, a citizen of the United States, residing at New Ulm, in the county of Brown and State of Minnesota, have invented certain new and useful Improvements in Wrist Pins; and I do hereby declare the following to be a full, clear, and exact description of the invention, such as will enable others skilled in the art to which it appertains to make and use the same.

This invention relates to a wrist pin to be used with a connecting rod and the invention is particularly designed for use with the wrist pins of internal combustion engines. Such wrist pins are usually carried in bosses or lugs in the piston and are embraced at the central portion by the connecting rod. It is quite important that the wrist pin tightly and accurately fit its seat in the piston. It is also necessary and desirable, after the engine has been run quite a while at times, to tighten the wrist pin in the piston as the same often becomes slightly loose from wear.

It is an object of this invention, therefore, to provide a wrist pin having a concentric opening therein, which pin is split longitudinally and has an expanding member driven into and held in said split portion.

It is also an object of this invention to provide an expanding member which extends across the concentric opening in the wrist pin and is held in operative position by the wall of said opening.

These and other objects and advantages of the invention will be fully set forth in the following description made in connection with the accompanying drawings in which like reference characters refer to the same parts throughout the different views, and in which Fig. 1 is a view partly in elevation and partly in section of a wrist pin showing the same in relation to the piston and connecting rod, a portion of the latter portion being shown in dotted lines;

Fig. 2 is a vertical section on the line 2—2 of Fig. 1;

Fig. 3 is a view in end elevation as seen from the right in Fig. 1;

Fig. 4 is a partial top plan view of the wrist pin;

Fig. 5 is a view in elevation of a modified form of wrist pin, a portion thereof being shown in section;

Fig. 6 is a view in vertical section taken on the line 6—6 of Fig. 5, showing a portion of the connecting rod in dotted lines;

Fig. 7 is a view in elevation of a further modified form of wrist pin, a portion of which is shown in section;

Fig. 8 is a view in vertical section taken on the line 8—8 of Fig. 7;

Fig. 9 is a view in elevation of a further modification, a portion being shown in section; and Fig. 10 is a view in vertical section on the line 10—10 of Fig. 9.

Referring to the drawings, in Fig. 1 is shown the outline of a piston for an internal combustion engine of the automobile type having the lugs $a$ for receiving the wrist pin 1 and showing the connecting rod $b$ embracing the said wrist pin. In accordance with this invention, the wrist pin 1 is provided with a concentric opening 2 and the pin is longitudinally split or provided with a slit 3. A tapered opening extends longitudinally of the pin substantially centrally of the split 3 and this opening is designed to have driven therein a tapered expanding member or key 4. If desired, the pin 1 may be formed with a boss or reinforced portion 5 surrounding the tapered opening receiving the pin 4, as shown in Figs. 2 and 3. The key 4, after being driven and fitted in place, is cut off so that its large end is substantially flush with the end of the wrist pin and it is secured in place by bending its small end to one side, the pin being cut away at 1ª to accommodate the bent-over end of the member 4.

The wrist pin can thus be quickly and accurately fitted into the piston lugs and the expanding member efficiently held in its correct position. In case the wrist pin becomes loose in the lugs $a$ from wear, the pin can be further expanded and again tightly fitted in said lugs by driving the key 4 to further expand the pin 1 and the said key can again be held in its adjusted position by again bending over the end thereof.

In the modification shown in Figs. 5 and 6, the pin 6 is shown having a slit or split 7 extending longitudinally thereof into the concentric opening 8 extending through the pin. A tapered opening is formed substantially centrally of the slit 7 adapted to receive the tapered expanding member or key 9. The large end of this key will, likewise, be cut off flush with the end of the pin 6 and the key will be held in place by bending the small end slightly to one side to lie in the cut-out portion 6ᵃ of the pin. This pin will be fitted to the piston the same as the pin 1 and the key 9 can be further driven in to expand the pin 6 to take up any looseness occasioned by wear.

In the modification shown in Figs. 7 and 8, the pin 10 is shown having the concentric opening 11 and having a longitudinally extending split or slit 12. This split is also formed substantially centrally thereof with an inwardly radially tapered opening adapted to receive an expanding member 13. This expanding member is provided with a portion 14 which extends across the opening 11 and is seated in a longitudinally tapered groove 15 formed in the opposite wall of opening 11. It will be seen that as the member 13 is driven into the pin, the same will be forced into the tapered opening in the slit and the ring will be thus expanded. The expanding member will be held to its operative position by engagement with the slot 15 and the same will be locked in position in the wrist pin by slightly bending over one corner thereof at the right hand end of the pin, as seen in Fig. 7, in a manner similar to that disclosed in Figs. 1 to 6. From the structures in Figs. 7 and 8 it will be clear that this pin can readily be fitted to the piston by expanding the same by the member 13 and that the pin can be further expanded by the expanding member to take up any looseness occasioned by wear.

In the modification shown in Figs. 9 and 10, a pin 16 is shown having the concentric opening 17, the split or slit 18 communicating therewith and which has a longitudinally tapered opening extending substantially centrally of the split 18. This latter opening is designed to receive the expanding member 19 which is longitudinally tapered in width. This expanding member 19 also has a portion extending across the opening 17 which is seated in a longitudinally extending groove 20 in the opposite wall of said opening. This groove 20 is of uniform depth. It will readily be seen that the ring will be expanded as the member 19 is driven thereinto. With this type of expanding member, the same will be cut off at its large end flush with the end of the pin and its small end will also lie flush or within the end of the pin, a corner of the same being bent to one side to hold said member or key in position. In Fig. 9, the key is shown as extending at each side of the pin and is illustrated in this position before being cut off and fastened in the said pin.

From the above description it is seen that applicant has provided a simple and improved type of wrist pin. Such a pin can be accurately and properly fitted in the piston in a much shorter time than the ordinary wrist pin and does not require the services of an expert mechanic. The invention shown herein is a development of the wrist pin shown in the patent granted to the applicant November 25th, 1919, No. 1,322,991. He has found by experiments that the pin can be more easily and cheaply made with the concentric opening. The concentric opening further gives an even distribution of metal about the pin. The expanding member furthermore balances the metal taken out at the split portion and the balance of the pin is not destroyed.

It has also been found that the angular shaped expanding member or keys are preferable to a perfectly round key as it is much easier to obtain and maintain a uniform bearing surface on the former. While in the structures illustrated the expanding member is shown as being held in place by bending over the end thereof, it will be understood that the same may be fastened in any suitable manner.

The pin of this invention when placed in position has the split portion extending across the longitudinal axis of the connecting rod as shown in Fig. 6. In operation, the connecting rod bushing or bearing bore wears at the top and bottom and very little if any at the sides. When the wrist pin is expanded by the key, it will, when placed as stated expand at the top and bottom and thus effectively take up the wear in the bearings. In installing the pin especially in replacement work, the same is placed in position and the engine run a while. After the bearings have gotten to run smoothly, the pin is slightly further expanded by movement of the expanding key and the pin thus brought to a perfect fit and bearing. The top and bottom surfaces of the pin do not wear appreciably and they thus maintain their cylindrical curved surface so that when the pin is subsequently expanded, it will nicely fill the worn portions of the connecting rod bearing and give a perfect fit. As the pin does not revolve but only oscillates through a small angle, a perfectly round pin is not needed, for as stated there is practically no wear on the sides of the pin.

It will also be understood that various changes may be made in the form, details and proportions of the parts without departing from the scope of applicant's invention, which, generally stated, consists in the matter shown and described and set forth in the appended claims.

What is claimed is:

1. A hollow wrist pin for connecting rods having a concentric opening of uniform cross sectional area extending longitudinally therethrough, said pin being longitudinally split and having a tapered opening extending substantially centrally through the said split portion and an expanding key disposed in said tapered opening leaving the greater part of said first mentioned opening unobstructed.

2. A hollow wrist pin for connecting rods having a concentric cylindrical opening of uniform cross sectional formation extending longitudinally therethrough, said pin being longitudinally split and having a tapered opening extending longitudinally thereof substantially centrally of said split, and an expanding member disposed in said latter opening and having a portion extending across the concentric opening in the pin and bearing against the inner portion thereof to hold the said expanding member in position.

3. A wrist pin for connecting rods having a concentric cylindrical opening extending therethrough, said pin being longitudinally split and having a tapered opening extending longitudinally thereof substantially centrally of said split and an expanding member disposed in said latter opening, and having a narrow flat portion extending across said concentric opening in the pin, said pin having a slot formed in the wall of said opening in which the said portion of the expanding member is disposed.

4. A connecting rod wrist pin for automobile engines, said completed pin having an opening therethrough of a diameter more than half the external diameter of the pin and said pin being split and having a tapered recess extending longitudinally centrally of said split, and a tapered key disposed in said recess having its small end bent laterally to hold the same in position.

5. A hollow wrist pin for connecting rods having an opening extending entirely therethrough concentric with its periphery, said pin being split at one side and having a tapered recess extending longitudinally of said split and a tapered key disposed in said recess and secured therein.

In testimony whereof I affix my signature.

WILLIAM AAB.